United States Patent
Hershman et al.

(10) Patent No.: US 11,520,940 B2
(45) Date of Patent: Dec. 6, 2022

(54) SECURED COMMUNICATION BY MONITORING BUS TRANSACTIONS USING SELECTIVELY DELAYED CLOCK SIGNAL

(71) Applicant: NUVOTON TECHNOLOGY CORPORATION, Hsin-chu (TW)

(72) Inventors: Ziv Hershman, Givat Shmuel (IL); Victor Adrian Flachs, Rishon Lezion (IL); Natan Keiren, Kfar-Saba (IL); Joram Peer, Tel Mond (IL); Yoel Hayon, Givatayim (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 313 days.

(21) Appl. No.: 16/907,248

(22) Filed: Jun. 21, 2020

(65) Prior Publication Data
US 2021/0397753 A1    Dec. 23, 2021

(51) Int. Cl.
*G06F 21/85*    (2013.01)
*G06F 21/72*    (2013.01)
*H03L 7/08*    (2006.01)
*G06F 13/16*   (2006.01)
*H03L 7/081*   (2006.01)
*G06F 1/04*    (2006.01)
*G06F 1/08*    (2006.01)

(52) U.S. Cl.
CPC ........... *G06F 21/85* (2013.01); *G06F 1/04* (2013.01); *G06F 1/08* (2013.01); *G06F 13/1605* (2013.01); *G06F 13/1689* (2013.01); *G06F 21/72* (2013.01); *H03L 7/081* (2013.01); *H03L 7/0805* (2013.01)

(58) Field of Classification Search
CPC ...... G06F 13/4282; G06F 21/72; G06F 21/85; G06F 1/04; G06F 1/08; H03L 7/0805
See application file for complete search history.

(56) References Cited

U.S. PATENT DOCUMENTS

| 5,696,994 A | 12/1997 | Pang |
| 5,713,006 A | 1/1998 | Shigeeda |
| 5,713,306 A | 2/1998 | Johnson |
| 5,740,404 A | 4/1998 | Baji |

(Continued)

OTHER PUBLICATIONS

U.S. Appl. No. 16/541,218 Office Action dated Dec. 29, 2021.

(Continued)

*Primary Examiner* — Brian T Misiura
(74) *Attorney, Agent, or Firm* — Kligler & Associates Patent Attorneys Ltd

(57) ABSTRACT

A security device includes a bus interface and circuitry. The bus interface is coupled to a bus connecting between a host device and a peripheral device. The circuitry is configured to receive, via the bus interface, a clock signal of the bus, and to produce a delayed clock signal relative to the clock signal. The circuitry is further configured to monitor, using the clock signal, transactions communicated between the host device and the peripheral device, in response to identifying a given transaction, of which a portion is expected to be delayed by a predefined time delay relative to the clock signal, to sample the portion of the given transaction using the delayed clock signal, and in response to identifying, based on the sampled portion, that the given transaction violates a security policy, to apply a security action.

18 Claims, 5 Drawing Sheets

(56) References Cited

U.S. PATENT DOCUMENTS

| | | |
|---|---|---|
| 6,026,293 A | 2/2000 | Osborn |
| 6,049,876 A | 4/2000 | Moughanni et al. |
| 6,088,450 A | 7/2000 | Davis et al. |
| 6,289,408 B1 | 9/2001 | Regal |
| 6,510,522 B1 | 1/2003 | Heinrich et al. |
| 6,832,317 B1 | 12/2004 | Strongin et al. |
| 7,065,654 B1 | 6/2006 | Gulick et al. |
| 7,155,615 B1 | 12/2006 | Silvester |
| 7,205,883 B2 | 4/2007 | Bailey |
| 7,496,929 B2 | 2/2009 | Dunstan |
| 7,664,836 B2 | 2/2010 | Kim |
| 7,797,115 B2 | 9/2010 | Tasher et al. |
| 8,782,434 B1 | 7/2014 | Ghose |
| 9,158,628 B2 | 10/2015 | Maity et al. |
| 9,239,925 B2 | 1/2016 | Cumming et al. |
| 9,432,298 B1 | 8/2016 | Smith |
| 10,095,891 B2 | 10/2018 | Hershman et al. |
| 10,303,880 B2 | 5/2019 | Hershman et al. |
| 10,452,582 B2 | 10/2019 | Hershman et al. |
| 10,776,527 B2 * | 9/2020 | Hershman ............ G06F 13/4282 |
| 10,783,250 B2 * | 9/2020 | Hershman ................ G06F 21/57 |
| 11,244,046 B2 * | 2/2022 | Hershman ................ G06F 1/08 |
| 2002/0087872 A1 | 7/2002 | Wells et al. |
| 2003/0061494 A1 | 3/2003 | Girard et al. |
| 2004/0081079 A1 | 4/2004 | Forest et al. |
| 2004/0255071 A1 | 12/2004 | Larson et al. |
| 2004/0268138 A1 | 12/2004 | Larson et al. |
| 2005/0021968 A1 | 1/2005 | Zimmer et al. |
| 2005/0132186 A1 | 6/2005 | Khan et al. |
| 2005/0204162 A1 | 9/2005 | Rayes et al. |
| 2006/0059360 A1 | 3/2006 | Ortkiese |
| 2006/0107032 A1 | 5/2006 | Paaske et al. |
| 2007/0109015 A1 | 5/2007 | Hanes et al. |
| 2008/0177994 A1 | 7/2008 | Mayer |
| 2008/0276302 A1 | 11/2008 | Touboul |
| 2008/0282017 A1 | 11/2008 | Carpenter et al. |
| 2010/0037321 A1 | 2/2010 | Oz et al. |
| 2012/0163589 A1 | 6/2012 | Johnson et al. |
| 2012/0210115 A1 | 8/2012 | Park et al. |
| 2012/0255012 A1 | 10/2012 | Sallam |
| 2012/0255014 A1 | 10/2012 | Sallam |
| 2013/0166975 A1 | 6/2013 | Son et al. |
| 2013/0254906 A1 | 9/2013 | Kessler et al. |
| 2013/0312099 A1 | 11/2013 | Edwards et al. |
| 2015/0026426 A1 | 1/2015 | Sahita et al. |
| 2016/0188909 A1 | 6/2016 | Zatko et al. |
| 2017/0206034 A1 | 7/2017 | Fetik |
| 2017/0364700 A1 | 12/2017 | Goldfarb et al. |
| 2018/0239727 A1 * | 8/2018 | Hershman ............ G06F 13/4221 |
| 2018/0365974 A1 * | 12/2018 | Haas ........................ G01D 3/08 |
| 2019/0236276 A1 | 8/2019 | Hershman et al. |
| 2019/0236278 A1 | 8/2019 | Martinez et al. |
| 2019/0236281 A1 | 8/2019 | Hershman et al. |

OTHER PUBLICATIONS

NXP Semiconductors "UM10204-I2C-bus specification and user manual", Revision 6, pp. 1-64, Apr. 4, 2014.

TCG Software Stack (TSS) Specification Version 1.2, Level 1, Errata A, Part 1: Commands and Structures, pp. 1-757, Mar. 7, 2007.

TCG PC Client Specific Implementation Specification for Conventional BIOS, Specification Version 1.21 Errata, Revision 1.00, pp. 1-151, Feb. 24, 2012.

TCG PC Client Specific TPM Interface Specification (TIS), Specification Version 1.3, pp. 1-112, Mar. 21, 2013.

TPM Main Specification, "Part 1—Design Principles", version 1.2, Revision 116, pp. 1-184, Mar. 1, 2011.

TPM Main Specification, "Part 2—Structures", version 1.2, Level 2, Revision 116, pp. 1-201, Mar. 1, 2011.

TPM Main Specification, "Part 3—Commands", version 1.2, Level 2, Revision 116, pp. 1-339, Mar. 1, 2011.

National Institute of Standards and Technology, "Implementation Guidance for FIPS 140-2 and the Cryptographic Module Validation Program", pp. 1-252, Mar. 28, 2003.

National Institute of Standards and Technology, "Security Requirements for Cryptographic Modules", FIPS PUB 140-2, pp. 1-69, May 25, 2001.

National Institute of Standards and Technology, "Secure Hash Standard (SHS)", FIPS PUB 180-4, pp. 1-36, Aug. 2015.

National Institute of Standards and Technology, "The Keyed-Hash Message Authentication Code (HMAC)", FIPS PUB 198-1, pp. 1-13, Jul. 2008.

Unified EFI Forum, Inc., "Unified Extensible Firmware Interface (UEFI) Specification", version 2.7, errata A, pp. 1-41 (chapter 8.2—pp. 237-259, chapter 23.1—pp. 1001-1016), Aug. 2017.

Unified EFI Forum, Inc., "Unified Extensible Firmware Interface (UEFI) Specification", version 2.7, errata A, pp. 1-36 (chapter 31—pp. 1697-1730), Aug. 2017.

Priya et al., "Digitally Controlled Delay Lines Based On NAND Gate for Glitch Free Circuits", International Journal of Emerging Technology and Advanced Engineering, vol. 4, Issue 2, pp. 665-667, Feb. 2014.

Winbond-Spiflash, "3V 256M-BIT, Serial Flash Memory With Dual/Quad SPI & QPI", pp. 1-104, Nov. 13, 2015.

Kirschner, U.S. Appl. No. 16/541,218, filed Aug. 15, 2019.

* cited by examiner

SECURED COMMUNICATION BY MONITORING BUS TRANSACTIONS USING SELECTIVELY DELAYED CLOCK SIGNAL

TECHNICAL FIELD

Embodiments described herein relate generally to electronic system security, and particularly to methods and systems for secured communication between host and peripheral devices by monitoring transactions over bus using selectively delayed clock signal.

BACKGROUND

Electronics systems use various types of bus interfaces for communicating between host devices and peripheral devices. One example of a bus interface is the Serial Peripheral Interface (SPI) bus. Peripheral devices that support SPI comprise, for example serial Flash memory devices.

SUMMARY

An embodiment that is described herein provides a security device that includes a bus interface and circuitry. The bus interface is coupled to a bus connecting between a host device and a peripheral device. The circuitry is configured to receive, via the bus interface, a clock signal of the bus, and to produce a delayed clock signal relative to the clock signal. The circuitry is further configured to monitor, using the clock signal, transactions communicated between the host device and the peripheral device, in response to identifying a given transaction, of which a portion is expected to be delayed by a predefined time delay relative to the clock signal, to sample the portion of the given transaction using the delayed clock signal, and in response to identifying, based on the sampled portion, that the given transaction violates a security policy, to apply a security action.

In some embodiments, the circuitry is configured to sample a request part of the given transaction sent from the host device to the peripheral device using the clock signal, and to sample a response part of the given transaction sent from the peripheral device to the host device using the delayed clock signal. In other embodiments, circuitry includes a Delay Line (DL), and the circuitry is configured to produce the delayed clock signal by delaying the clock signal using the DL. In yet other embodiments, the DL includes a Delay Locked Loop (DLL) including a chain of multiple delay elements with selectable outputs.

In an embodiment, the DL supports multiple selectable settings corresponding to multiple respective time delay values, and the circuitry is configured to select among the settings a chosen setting for which an actual time delay between the delayed clock signal and the clock signal best approximates the predefined time delay, and to set the DL to the chosen setting. In another embodiment, to calibrate the DL, the circuitry is configured to operate the DL in a ring oscillator mode, to measure a frequency produced by the DL in the ring oscillator mode, and to calculate the actual time delay based on the measured frequency. In yet another embodiment, the circuitry is configured to calibrate the DL during time periods in which no transactions that require sampling using the delayed clock are expected.

In some embodiments, the circuitry includes another DL, and the circuitry is configured to calibrate the another DL to produce a calibrated delayed clock signal based on the predefined time delay, and to select the calibrated delayed clock signal instead of the delayed clock signal. In other embodiments, the bus includes a Serial Peripheral Interface (SPI) bus, the peripheral device includes a SPI Flash memory that provides delayed data upon read, the given transaction includes a read operation from the SPI Flash memory, and the circuitry is configured to sample the delayed data retrieved from the SPI Flash memory using the delayed clock signal. In yet other embodiments, to identify that the given transaction violates the security policy, the circuitry is configured to (i) detect an attempt to access a protected address region in the peripheral device, or (ii) identify that data sent to the host device is invalid.

There is additionally provided, in accordance with an embodiment that is described herein, a method for data security, including, in a security device that includes a bus interface coupled to a bus connecting between a host device and a peripheral device, receiving, via the bus interface, a clock signal of the bus, and producing a delayed clock signal relative to the clock signal. Using the clock signal, transactions communicated between the host device and the peripheral device are monitored. in response to identifying a given transaction, of which a portion is expected to be delayed by a predefined time delay relative to the clock signal, the portion of the given transaction is sampled using the delayed clock signal. In response to identifying, based on the sampled portion, that the given transaction violates a security policy, a security action is applied.

These and other embodiments will be more fully understood from the following detailed description of the embodiments thereof, taken together with the drawings in which:

DETAILED DESCRIPTION OF EMBODIMENTS

Overview

Figure 1:
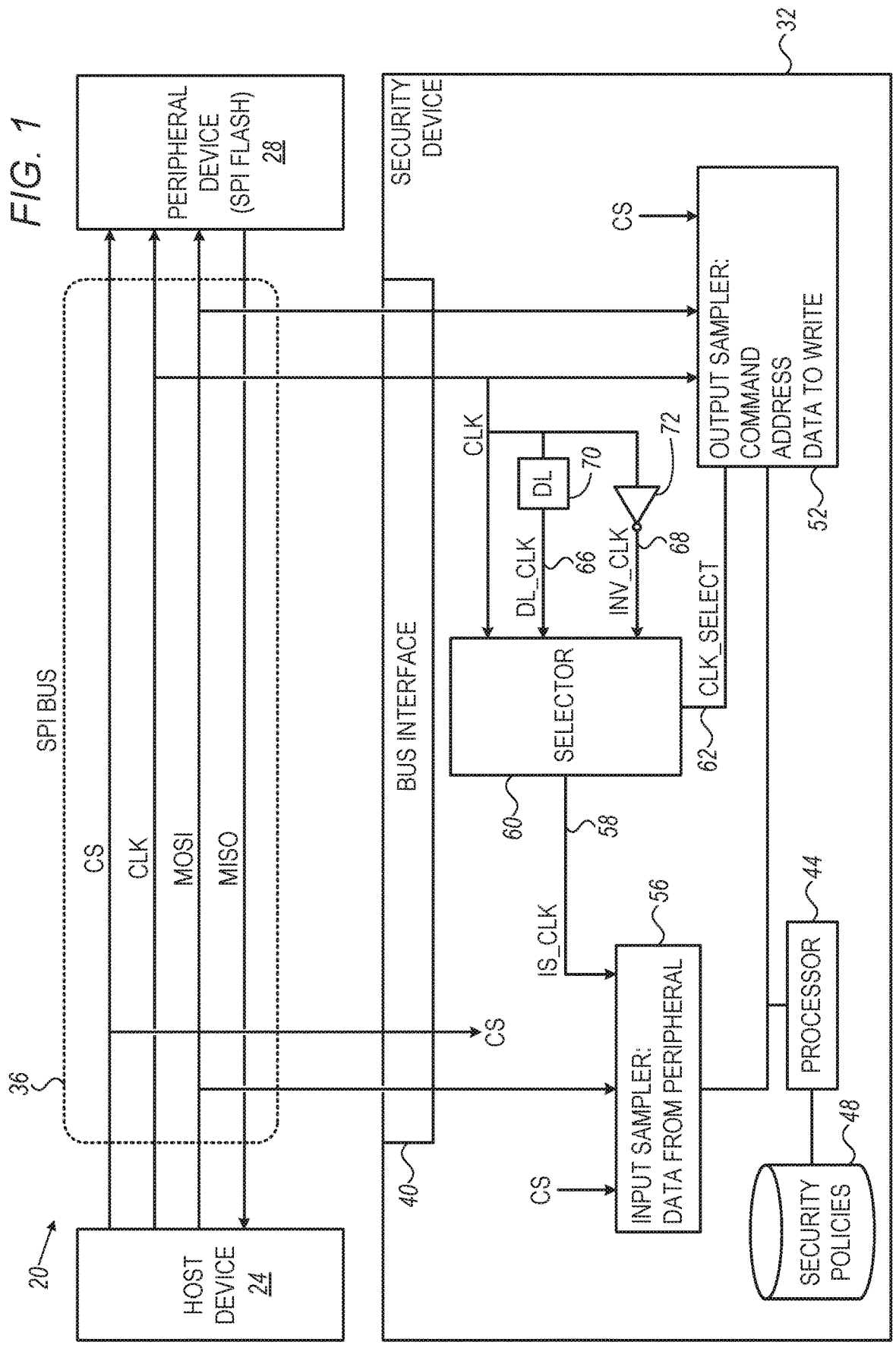
FIG. 1 is a block diagram that schematically illustrates a secured system, in accordance with an embodiment that is described herein.

Embodiments that are described herein provide improved methods and devices for secured communication between host and peripheral device by monitoring transactions over bus using selectively delayed clock signal. Peripheral devices may comprise, for example, cryptographic engines, memory devices that store sensitive data, or any other suitable device that is accessible over a bus.

In some disclosed embodiments, a security device monitors transactions on the bus, and identifies transactions that violate system security. Security violation may occur when a host device or other bus-master device attempts to access the peripheral device without authorization. In another type of security violation, an attacker may force invalid data on the bus. Transactions on the bus may be classified as violating or non-violating using any suitable criterion or policy. In response to detecting a transaction that violates system security, the security device applies a suitable security action.

In some embodiments, the bus connecting between the host device and the peripheral device comprises a Serial Peripheral Interface (SPI) bus, or any other suitable bus. The SPI bus comprises a SPI clock signal and in one bus configuration two data lines referred to as a Master-Out Slave-In (MOSI) and a Master-In Slave-Out (MISO). The SPI bus additionally comprises a dedicated Chip-Select (CS) line for selecting each slave peripheral device.

A transaction on the SPI bus typically comprises a command, and possibly an address and/or data. When the peripheral device comprises, for example, a Flash memory device, the host device reads data from the Flash device by sending a command, followed by an address over the MOSI line (also referred to herein as a request part), and receiving the read data over the MISO line (also referred to herein as a response part). The host sends the command and address parts synchronized to the SPI clock signal. In the opposite direction, however, data sent by the Flash device to the host device may be delayed relative to the SPI clock signal, e.g., due to long response time of the Flash device.

In principle, the security device could monitor transactions over the MOSI and MISO lines based on the SPI clock signal. Sampling delayed data using the SPI clock signal, however, may result in erroneous data, thus degrading the level of system security.

In some embodiments, to compensate for the delayed data, the security device samples the delayed data using a delayed clock that is time-shifted relative to the SPI clock. The security device may decide to monitor the MISO line, at different time periods, using the SPI clock or the delayed clock depending on the type of peripheral and the command of the underlying transaction.

In some embodiments, the security device derives the delayed clock signal, from the SPI clock, using a Delay Line (DL). The security device selects the delayed clock signal for sampling transactions at transaction portions that are expected to be delayed relative to the SPI clock signal. In an embodiment, the DL comprises a Delay Locked Loop (DLL) comprising a chain of multiple selectable delay elements.

In some embodiments, the DL supports multiple selectable time delay settings corresponding to multiple delay values. To calibrate the DL to a required time delay, the security device selects one of the time delay settings, for best approximating the required time delay, and controls the DL to the chosen delay setting. The required time delay may be specified, for example, by the vendor of the peripheral device. The security device may calibrate the DL and estimate the actual time delay by configuring the DL to operate in a ring oscillator mode, measuring a frequency produced by the DL in the ring oscillator mode, and calculating the actual time delay based on the measured frequency.

The security device may perform DL calibration, e.g., once at power up or reset, periodically, and/or conditionally, e.g., depending on changes in environmental and operational conditions such as temperature and supply voltage.

In some embodiments, the security device calibrates the DL at "safe" time periods, during which no transactions whose sampling required a DL-delayed clock are expected. In other embodiments, for calibration at any desired time, the security device comprises two DLs, wherein at any given time one DL generates the delayed clock and the other DL is available for calibration. After calibrating the available DL, the two DLs may switch roles.

The security device may identify that a given transaction violates the security policy in various ways. In some embodiments, the security device identifies system violation by (i) detecting an attempt to access a protected address region in the peripheral device, or (ii) identifying that data sent to the host device is invalid.

In the disclosed techniques, a security device samples transaction portions that are delayed, using a delayed clock signal derived from the SPI clock signal, e.g., using a DL. Based on the type of device and possibly on a command part of the transaction, the security device selects the delayed clock instead of the SPI clock, only for certain transactions, and portions of transactions that are expected to be delayed relative to the SPI bus clock. The security device calibrates the DL to a required time delay so that the delayed portion can be sampled accurately even when environmental and operational conditions may change. Using the disclosed techniques, the security device can reliably monitor all transactions and apply security actions upon detecting violation of system security.

System Description

FIG. 1 is a block diagram that schematically illustrates a secured system 20, in accordance with an embodiment that is described herein. In the example of FIG. 1, secured system 20 comprises a host device 24, a peripheral device 28 and a security device 32, all connected to a SPI bus 36. In the present example peripheral device 28 comprises a SPI Flash memory device. Alternatively, other suitable peripheral devices can also be used.

Security device 32 identifies transactions violating the system security. A transaction that violates system security may be caused by an attacker that gains control of host device 24, peripheral device 28 and/or SPI bus 36. A transaction may violate system security, for example, when host device 24 attempts to access peripheral device 28 without authorization. As another example, the peripheral device or an attacker may attempt to provide invalid data to the host device over the bus.

In the present example, security device 32 comprises a bus interface 40 for connecting to SPI bus 36, a processor 44 that is configured to carry out some of the disclosed techniques, and a memory 48 that is configured to store one or more security policies enforced by processor 44.

In FIG. 1, SPI bus 36 comprises a clock (CLK) line, and two data lines referred to as Master-Out Slave-In (MOSI) and Master-In Slave-Out (MISO). The CLK, MOSI and MISO lines are common to all peripheral devices coupled to the bus (in the present example only to peripheral device 28). In addition, each slave device is selectable using a dedicated Chip-Select (CS) line. In the present example, host device 24 selects peripheral device 28 using a CS line denoted CS.

In general, host device 24, being a master, is connected to CS lines of all peripheral devices. The peripheral devices, on the other hand, are slaves and therefore each peripheral device is only connected to its own CS line. Typically, host device 24 initiates a transaction by selecting the desired peripheral device using the respective CS line, and then communicates with the device using the CLK, MOSI and MISO lines. The MOSI line is used for transmitting from the host device to the peripheral device, and the MISO line is used for transmitting from the peripheral device to the host device.

Security device 32 monitors transactions over SPI bus 36 using an output sampler 52 and an input sampler 56. Output sampler 52 receives the CLK signal of the SPI bus and samples serial information sent by the host device over the MOSI line, using the CLK signal. Output sampler 52 samples commands, addresses and data to be written sent from host device 24 to the peripheral device over the MOSI line. Input sampler 56 samples data sent by the peripheral device to the host device over the MISO line.

In some transactions, the peripheral device sends data on the MISO line with some delay relative to the SPI CLK. This may occur, for example, in reading a SPI Flash memory, due to a relatively long response time of the Flash device. As a result, the input sampler may sample the read data at nonoptimal time instances, which result in erroneous data. In such cases, input sampler 56 samples the MISO line, during the data phase of the transaction, using a clock signal comprising a delayed version of the SPI CLK signal, thus compensating for the delayed data. The delayed clock should be tuned to provide sufficient setup time for sampling the data.

In the example of FIG. 1, a selector 60 provides an input sampler clock signal 58 (denoted IS_CLK) to input sampler 56. Selector 60 selects among the (non-delayed) SPI CLK signal, and two clock signals 66 and 68, respectively denoted DL_CLK and INV_CLK, each of which comprising a delayed version of the SPI CLK signal. A Delay Line (DL) 70 generates the DL_CLK signal, whereas an inverter logic gate 72 generates the INV_CLK signal.

In some embodiments, DL 70 comprises an adjustable DL that supports multiple selectable time delay settings, wherein each setting corresponds to a different delay value. As will be described in detail below, DL 70 may be calibrated by selecting one of the selectable time delay settings for best approximating a required time delay. The required delay may be specified, for example, by the vendor or manufacturer of the peripheral device. In some embodiments, DL 70 comprises a Delay Locked Loop (DLL) comprising a chain of multiple selectable delay elements. The DLL may be calibrated by selecting the output of one of the delay elements. DL calibration strategies will be described in detail below.

Inverter logic gate 72 generates the INV_CLK signal delayed by half a cycle period relative to the SPI CLK signal. The INV_CLK signal may be used, for example, when the required time delay is close to half the CLK cycle period and is unsupported by any of the DL settings.

In the example of FIG. 1, selector 60 is controlled by a (two-bit) select signal 62 (denoted CLK_SELECT) generated by output sampler 52. Alternatively, select signal 62 may be generated by processor 44 or in combination of processor 44 and output sampler 52, or by any suitable element of the security device. In some embodiments, select signal 62 causes the selector to output the SPI CLK signal for most transactions, and to select one of delayed clock signals 66 and 68 for selected transactions in periods during which a portion of the transaction is delayed relative to the SPI CLK. Output sampler 52 samples the transaction command, and based on the command type determines cycles of the transaction that require sampling using a delayed clock signal (if any). For example, in reading a SPI Flash device, the select signal selects the delayed clock 66, during the data phase on the MISO line.

Processor 44 receives transaction information sampled by output sampler 52 and input sampler 56. Processor 44 may classify a transaction as violating or non-violating system security in accordance with any predefined or configured policy. In some embodiments, the policy or policies for distinguishing between violating and non-violating transactions are stored in memory 48.

Generally, a transaction that violates system security may attempt to write data to the peripheral device, read data from the peripheral device, configure or send a command to the peripheral device, or access the peripheral device in any other suitable way. As one example, a violating transaction may attempt to access a protected address region in the peripheral device. As another example, the address part of the transaction may be authorized, but the data read from the memory device may be invalid.

Upon identifying a transaction that violates system security, processor 44 performs a suitable security action. In an example embodiment, the security action comprises disrupting the transaction by deliberately forcing the values of one or more lines or signals of the bus to some dummy values, in parallel to the transaction. Techniques for disrupting unauthorized transactions on SPI and other buses are described, for example, in U.S. Patent Application Publication 2019/0236281, Aug. 1, 2019, whose disclosure is incorporated herein by reference.

Secured System with Dual/Quad SPI Bus

Figure 2:
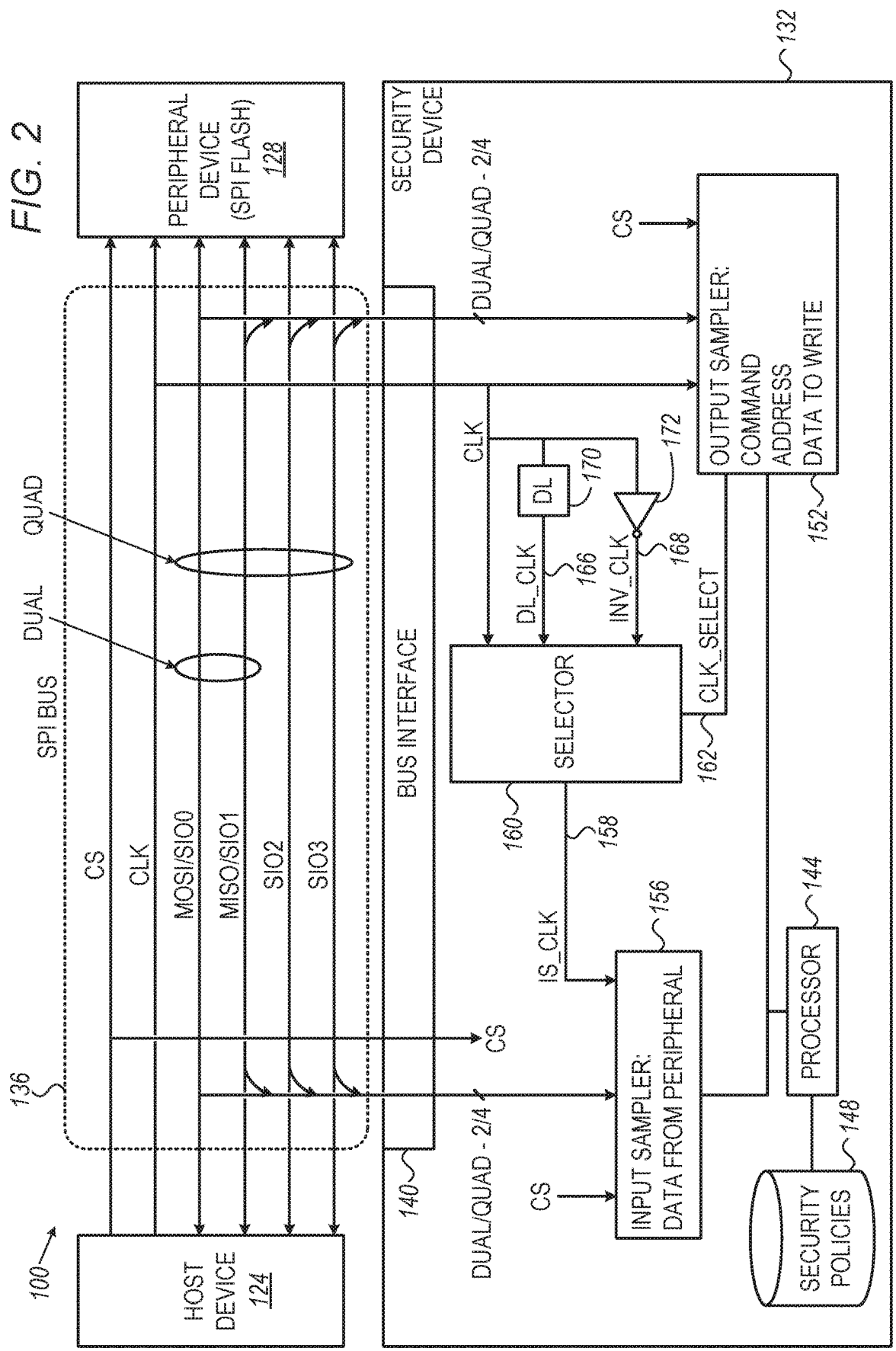
FIG. 2 is a block diagram that schematically illustrates a secured system, in accordance with another embodiment that is described herein.

FIG. 2 is a block diagram that schematically illustrates a secured system 100, in accordance with another embodiment that is described herein.

Secured system 100 is and secured system 20 are similar and operate on the same principles. The main difference between systems 100 and 20 is that in system 20 the SPI bus operates in a single mode, and in system 100 the SPI bus operates in a Dual or Quad mode, as will be described below. Basically, secured system 100 comprises the same elements as secured system 20, which are modified to support the Dual and Quad modes.

In secured system 100, a host device 124, a peripheral device 128 and a security device 132, are all connected to a SPI bus 136 that supports Dual SPI and Quad SPI half-duplex modes of operation.

In the SPI Dual mode, the MOSI and MISO lines are used as Serial I/O (SIO) lines denoted SIO0 and the SIO1, for transferring two bits from the peripheral device to the host device in a single clock cycle. The host initiates a transaction by sending a command to the peripheral device over the MOSI line. The host device may send one bit per cycle of the transaction address over the MOSI line alone, or two address bits per clock cycle over both the MOSI and MISO lines. Using the Dual mode, host device 124 can read data from the peripheral device (e.g., SPI Flash device) at twice the data rate supported in the single mode SPI bus of secured system 20.

In the SPI Quad mode, two I/O lines denoted SIO2 and SIO3 are additionally used, thus supporting transferring four data bits from the peripheral device to the host device in a single clock cycle. Host device 124 may send one bit per cycle of the command, address, or both over the MOSI line alone, or alternatively, two or four bits per cycle over two or four lines. Using the Quad mode, host device 124 can read data from the Flash device at four times the data rate compared to the single mode SPI bus of secured system 20.

Security device 132 comprises an output sampler 152 and an input sampler 156. In the example of FIG. 2, it is assumed that host device 124 sends to peripheral device 128 commands, addresses and data over the MOSI line, and receives data from the peripheral device over the SIO0 and SIO1 lines in Dual mode and over SIO0-SIO3 in Quad mode. In this configuration, output sampler 152 receives the MOSI line via bus interface 140, and input sampler 156 receives lines SIO0 and SIO1 via the bus interface in Dual mode, or all SI0-SI3 in the Quad mode. In an alternative embodiment, output sampler 152 receives the SI0-SI3 lines, and samples the two SI0 and SI1 lines in the Dual mode, or all SI0-SIo3 lines in the Quad modes.

In general, output sampler 152 and input sampler 156 perform sampling sequences that are different in the Dual and Quad modes for the same transactions. The input sampler and output sampler thus follow the transaction sequence so as to sample the command, address and data over the relevant lines, depending on the Dual and Quad modes.

Input sampler 152 samples the relevant bus lines in relevant portions of the transaction using a clock signal 58 denoted IS_CLK. Based on a sampled command and/or address, output sampler 152 generates a CLK_SELECT signal 162 for controlling a selector 160 to output on IS_CLK 58 one of the SPI CLK signal, a delayed clock 166 denoted DL_CLK and an inverted clock signal 168 denoted INV_CLK. DL_CLK and INV_CLK are generated from the SPI CLK using a DL 170 and an inverter logic gate 172, respectively.

Secured system 100 comprises a processor 144 that functions similarly to processor 44 of secured system 20. Processor 144 receives from output sampler 152 and from input sampler 156, transaction information, and determines whether the transaction violates a security policy, e.g., among security policies stored in a memory 148. In response to detecting a transaction violation, processor 144 applies a suitable security action, as described above.

The configurations of secured systems 20 and 100, host devices 24 and 124, peripheral devices 28 and 128 and security devices 32 and 132 in FIGS. 1 and 2 are example configurations, which is chosen purely for the sake of conceptual clarity. In alternative embodiments, any other suitable secured system, host device, peripheral device and security device configurations can also be used.

Elements that are not necessary for understanding the principles of the present invention, such as various interfaces, addressing circuits, timing and sequencing circuits and debugging circuits, have been omitted from the figures for clarity.

The different elements of security devices 32 and 132 may be implemented using any suitable hardware, such as in one or more Application-Specific Integrated Circuits (ASICs) or Field-Programmable Gate Arrays (FPGAs). In some embodiments, some elements of security devices 32 and 132 can be implemented using software, or using a combination of hardware and software elements.

Memory 48 in FIG. 1 and memory 148 in FIG. 2 may comprise any suitable storage of any suitable technology such as, for example, a Random Access Memory (RAM) or a nonvolatile memory.

Typically, each of processors 44 and 144 comprises a general-purpose processor, which is programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

In the context of the present disclosure and in the claims, all the elements in security device 32 and in security device 132, excluding respective bus interfaces 40 and 140, are collectively referred to as "circuitry." In FIG. 1 (FIG. 2) the circuitry comprises processor 44 (144), memory 48 (148), output sampler 52 (152), input sampler 56 (156), selector 60 (160), DL 70 (170) and inverter logic gate 72 (172).

Timing Diagram of a Transaction Using Delayed Clock

Figure 3:
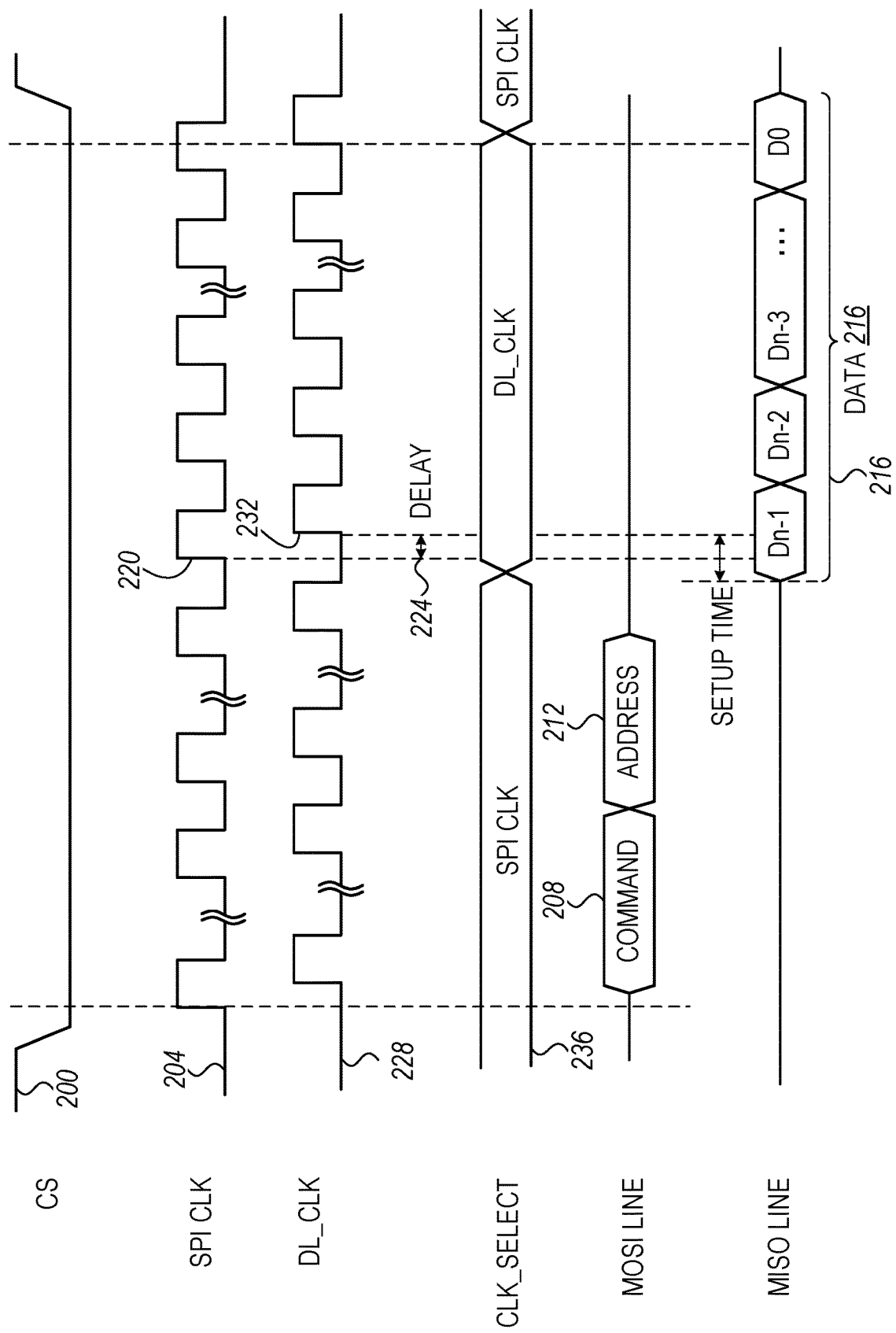
FIG. 3 is a timing diagram that schematically illustrates various bus and clock signals produced during a read transaction, in accordance with an embodiment that is described herein.

FIG. 3 is a timing diagram that schematically illustrates various bus and clock signals produced during a read transaction, in accordance with an embodiment that is described herein.

In FIG. 3, the read transaction is executed over SPI bus 36 in secured system 20 of FIG. 1. The read transaction is initiated by host device 24 for reading data from a SPI Flash device (28) over SPI bus 36. Security device 32 monitors the MOSI and MISO bus lines during the read transaction.

In FIG. 3, host device 24 generates a Chip-Select (CS) signal 200 for selecting Flash device 28. Host device 24 further generates a SPI CLK signal 204 for serially communicating with Flash device 28.

In the example of FIG. 3, host device 24 sends to Flash device 28, over the MOSI line, a command 208, denoted COMMAND, and an address 212, denoted ADDRESS. In the present example, command 208 comprises a read command that instructs the Flash device to read from address 212. The Flash device requires the requested data 216 (denoted DATA) and sends it to Host device 24 over the MISO line.

In the present example, command 208 may comprise 8 bits, address 212 may comprise 32 bits and data 216 may comprise 'n' bits. The number n of data bits may comprise any suitable integer multiple of 8 bits, e.g., n=32 bits. Alternatively, other suitable command, address and data lengths can also be used. In FIG. 3, the host device sends the bits of command 208 and address 212 in synchronization with raising edges of SPI CLK 204. Output sampler 52 samples the bits of command 208 and address 212 on falling edges of SPI CLK 204.

Bits of data 216 sent by the peripheral device to the host device over the MISO line are normally expected to be synchronized to rising edges of SPI CLK 204. The data bits are pushed in response to the falling edges of the SPI CLK. For reliable sampling, the rising edges of SPI CLK signal 204 should optimally be aligned to mid-bit instances. This means that the rising edge of the clock signal should occur after a sufficient setup time. In FIG. 3, however, the rising edge (220) of SPI CLK fails to meet the setup time requirement. By delaying the SPI CLK by a time period 224, denoted DELAY, the data bits can be sampled with sufficient setup time. In some embodiments, the length of DELAY 224 is predefined, e.g., deduced from information provided by the vendor of the peripheral device. This delay reflects the response time incurred by the Flash device between the time of receiving the address, and the time of outputting the first data bit on the MISO line.

For reliable sampling of data 216, security device 32 samples data 216 using a delayed clock signal 228 (denoted DL_CLK) whose rising edges are aligned to data 216 mid-bit instances. As shown in the figure, rising edge 232 of DL_CLK is alighted to the first mid-bit time of data 216. DL_CLK 228 of FIG. 3 may be identified as DL_CLK 66 of FIG. 1 (and DL_CLK 166 of FIG. 2).

In FIG. 3, a CLK_SELECT signal 236 is a two-bit signal distinguishes among three clock sources as described above in FIG. 1. In the present example, CLK_SELECT signal distinguishes between time periods during which sampling command and address information is based on the SPI CLK, and a time period during which sampling read data is based on DL_CLK 66. CLK_SELECT signal 236 of FIG. 3 may be identified as CLK_SELECT signal 62 of FIG. 1 (and CLK_SELECT signal 162 of FIG. 2).

Although FIG. 3 depicts bus and clock signals of secured system 20 of FIG. 1, similar behavior applies to secured system 100 of FIG. 2, in which two or four data bits are sent (delayed) to the host device and are reliably sampled using a delayed clock.

Figure 4:
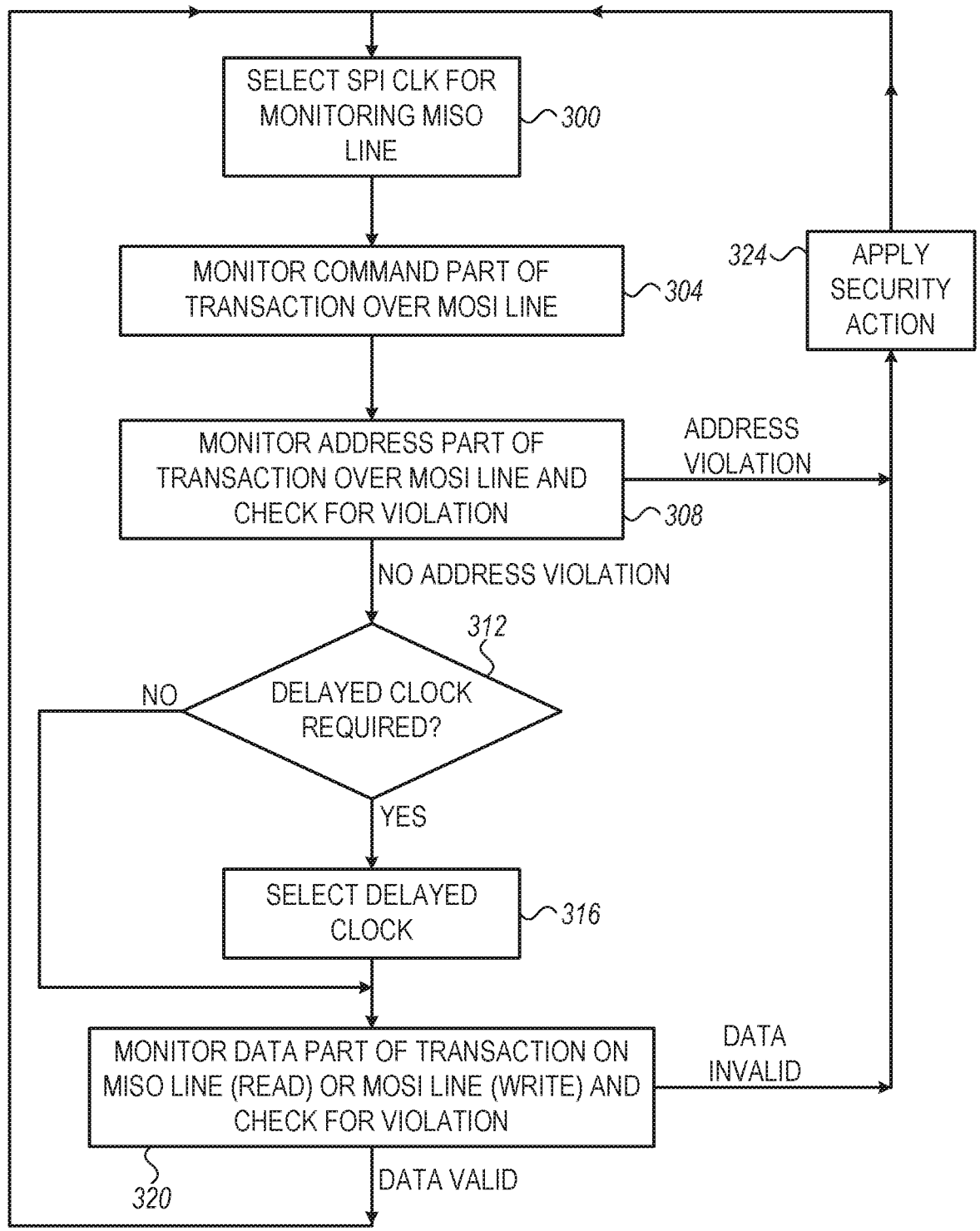
FIG. 4 is a flow chart that schematically illustrates a method for secured bus communication with monitoring transactions over the bus using selectively delayed clock signal, in accordance with an embodiment that is described herein.

Methods for Secured Bus Communication by Monitoring Transactions Using Selectively Delayed Clock Signal FIG. 4 is a flow chart that schematically illustrates a method for secured bus communication with monitoring transactions over the bus using selectively delayed clock signal, in accordance with an embodiment that is described herein;

The method will be described as executed by security device 32 in secured system 20. The method is, however, similarly applicable in security device 132 of secured system 100.

In describing the method, it is assumed that host device 24 communicated with a Flash device 28. In the present example, purely for the sake of clarity, the host may initiate a write transaction for writing data to some address of the Flash device, or a read transaction for reading data stored in some address of the Flash device.

In a write transaction, security device 32 samples the command, address and data to be written over the MOSI line using the SPI CLK. In a read transaction, the security device samples the data read over the MOSI line using a delayed clock (e.g., DL_CLK 66).

The method begins with output sampler 52 controlling selector 60 to select the SPI CLK signal, to be used for monitoring transactions over the MISO line of SPI bus 36 by input sampler 56, at a SPI CLK selection step 300. At a command sampling step 304, output sampler 52 monitors the MOSI line of the SPI bus (using the SPI CLK) and samples the command part of a transaction.

Based on the command type (in this example, the command type can be a memory read or memory write), output sampler 52 determines whether the transaction contains an address part, a data part or both. Moreover, based on the command type, the output sampler determines the sequence and timing of the underlying transaction. For example, using prestored transaction information, the output sampler identifies clock cycles associated with the address part and with the data part of the transaction. In the present example, the transaction comprises a write command or a read command, both followed by an address part.

At an address monitoring step 308, output sampler 52 samples (using the SPI CLK) the address part of the transaction over the MOSI line. Processor 44 receives the sampled address from output sampler and determines, using one or more security policies in memory 48, whether the sampled address violates system security, e.g., by accessing a protected address region in the Flash device.

When at step 308 no address violation occurs, the method proceeds to a clock query step 312, at which output sampler 52 checks whether sampling the data part of the transaction requires a delayed clock. In an embodiment, the decision at step 312 is based on the command type. For example, the output sampler may decide for a transaction that reads data from a Flash device to sample the data over the MISO line using a delayed clock.

In response to detecting, at step 312, that delayed clock is required, the output sampler controls selector 60 to output the delayed clock (e.g., DL_CLK 66 or INV_CLK 68), at a clock selection step 316. Otherwise, the output sampler controls selector 60 to continue outputting the SPI CLK.

At a data monitoring step 320, input sampler 56 samples the data part of the transaction. For sampling the data part of a read transaction comparing a memory read command, selector 60 selects the delayed clock, as described above. For any other command type, input sampler 56 samples the data part using the SPI clock. Processor 44 receives the sampled data from input sampler 56 (read command) or from output sampler 52 (write command) and determines, using security policies in memory 48, whether the data is valid or invalid.

When at step 320 processor 44 detects no data violation, the method loops back to step 300, to monitor subsequent transactions on SPI bus 36. When at step 320 the data is invalid, or at step 308 the address was found unauthorized, the method proceeds to a security application step 324, at which processor 44 applies any suitable security action. Following step 324 the method loops back to step 300.

In the method of FIG. 4, it was assumed that the peripheral device comprises a SPI Flash device supporting write and read transactions. In alternative embodiments, the SPI Flash device may support additional commands, e.g., configuration and status read command. Moreover, the peripheral device may comprise another type or device other than SPI Flash device, supporting other types of commands. In cases of this sort, the method of FIG. 4 may be extended accordingly.

Delay Line Calibration

Figure 5:
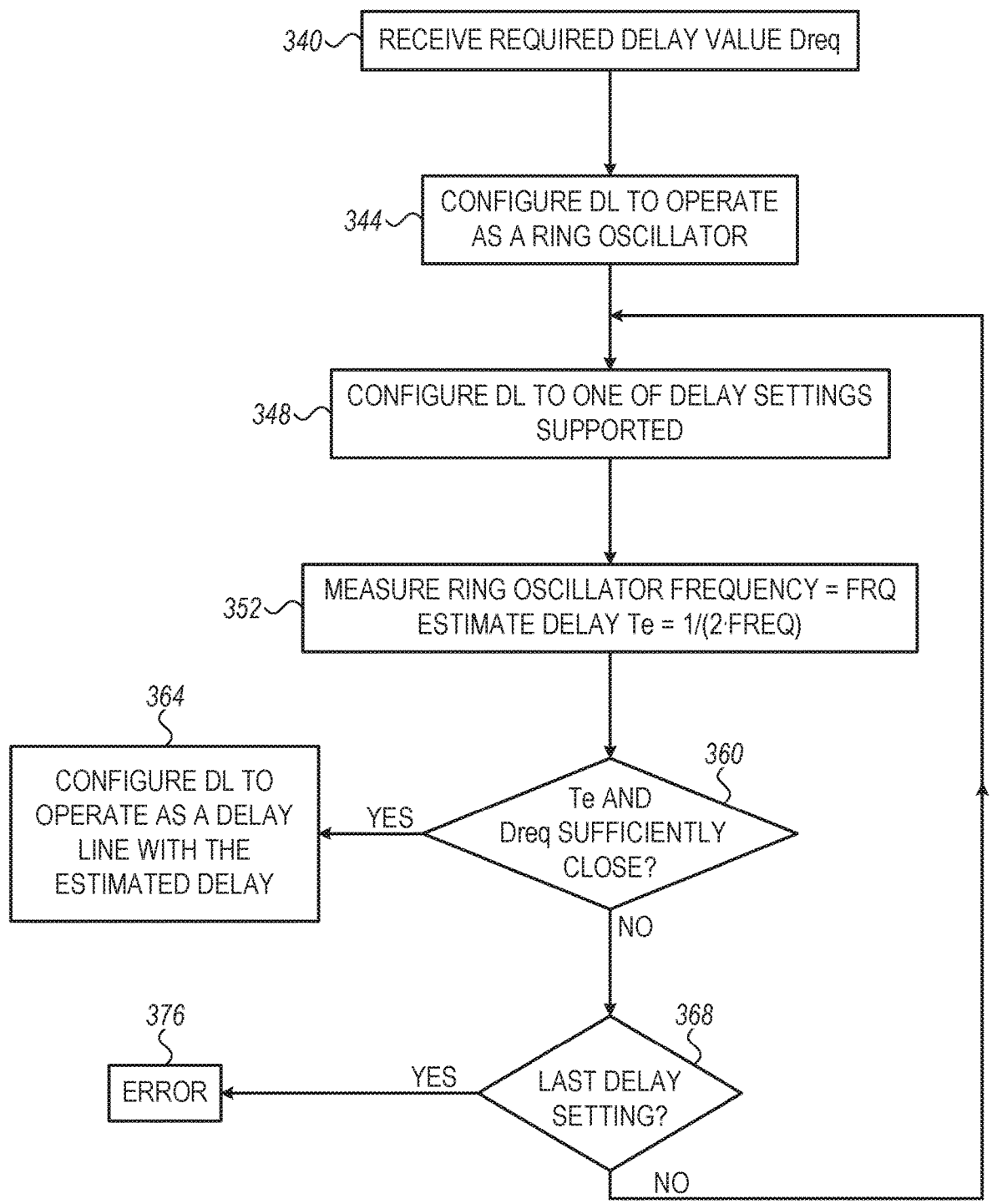
FIG. 5 is a flow chart that schematically illustrates a method for calibrating a tunable Delay Line (DL), in accordance with an embodiment that is described herein.

FIG. 5 is a flow chart that schematically illustrates a method for calibrating a tunable Delay Line (DL), in accordance with an embodiment that is described herein.

In some embodiments, the method is used by security device 32 or 132 for calibrating respective DL 70 or 170. The method will be described as executed by processor 44 but may be similarly be executed by processor 144.

In describing the method, it is assumed that DL 70 supports multiple selectable delay settings, wherein each delay setting is associated with a corresponding delay value. Note that the actual delay associated with a given DL setting may change due to environmental changes such as supply voltage and temperature.

It is additionally assumed that the DL can be configured to operate in a delay line mode or in a ring oscillator mode. In the delay line mode, the DL applies time shift to an input signal in accordance with a selected delay setting. In the ring oscillator mode, the output of the DL is fed back, logically inverted, to its input. When configured to the ring oscillator mode, the DL behaves as a ring oscillator that outputs a square wave signal having a duty cycle 2T, wherein T denotes the time delay of the DL. It is further assumed that the DL (or any other suitable element of the security device) comprises processing logic for measuring the frequency of the square wave produced in the ring oscillator mode.

The method begins with processor 44 receiving, at a delay requirement step 340, a required delay value, denoted Dreq, which typically depends on the type of peripheral device 28.

The required delay may be preprogrammed in the security device or provided to the processor, e.g., by host device 24. When a previous calibration has been performed, the required delay should correspond to a given delay setting of the DL, as determined in performing the previous calibration.

At a ring oscillator mode setting step 344, processor 44 configures the DL to operate in the ring oscillator mode. In the ring oscillator mode, the processor tests one or more of the DL delay settings and measures corresponding DL delay values. The processor selects a delay setting that results in an actual delay value that best approximates the required delay Dreq.

At an initial delay setting step 348, the processor configures the DL to one of the delay settings supported. For example, the processor may select a delay setting corresponding to the lowest or highest delay value, or some middle delay value. In another embodiment, the processor may start with a delay setting that best approximated the required delay value in a previous calibration session.

At a delay estimation step 352, the DL first measures the frequency (denoted FRQ) of the square wave produced in ring oscillator mode. Processor 44 receives the measured FRQ value, and calculates an estimated delay value denoted Te, as Te=1/(2·FRQ).

At a termination checking step 360, the processor checks whether the estimated delay value Te is sufficiently close to the required delay value Dreq. In an example embodiment, the processor checks whether the time difference between Te and Dreq is smaller than a predefined time limit.

When the outcome at step 360 is positive, the processor configures the DL to operate in the delay line mode, and configures the DL delay to the recent delay setting tested corresponding to Te, at a delay line setting step 364, which concludes successful calibration, and the method terminates. Otherwise, processor 44 proceeds to a loop termination step 368, at which the processor checks whether all the supported delay settings have been tested.

When the outcome at step 368 is negative, the processor loops back to step 348 to configure the DL (still in ring oscillator mode) to one of the delay settings not yet visited in the current calibration session. The processor may select a subsequent delay setting using any suitable method, such as, for example, using a sequential selection or using a binary search approach.

When the outcome at step 368 is positive, all the supported delay settings have been tested, but none of the corresponding delay values was sufficiently close to the required delay value Dreq. In this case, the processor issues an error, at an error reporting step 376, and the method terminates.

In some embodiments the processor calibrates DL 70 using method of FIG. 5 only once at powerup or reset. In yet other embodiments, e.g., due to change in environmental or operational conditions, such as temperature and supply voltage, the delay to which the DL was configured at powerup calibration may become inaccurate, and may result in erroneous monitoring and reduced level of system security. In such embodiments, the method of FIG. 5 may be executed occasionally, e.g., periodically, or based on detecting a significant change in environmental/operational conditions. For example, perform recalibration when the temperature (and/or supply voltage) has changed beyond a predefined limit since the last calibration.

Since DL calibration is performed in the ring oscillator mode, the DL cannot function as a delay line for monitoring purposes during calibration periods. For retaining high level of system security, the processor is configured to calibrate the DL when no transactions that are monitored using a delayed clock produced by the DL are expected. For example, the processor may calibrate the DL when no transactions are expected, when only write transactions are expected, or when slow clock read transactions are expected.

In some embodiments, to support DL calibration at any desired time, the security device comprises two DL modules. When one DL (DL1) is used for monitoring, the other DL (DL2) is available for calibration. The processor may decide to calibrate DL2 and then switch roles between the two DLs so that the recently calibrated DL2 is used for monitoring, and DL1 becomes available for calibration. At a later suitable time, the processor may decide to recalibrate DL1 and switch the DLs roles again. In some embodiments, the processor switches roles between DL1 and DL2 during safe time periods, during which no DL is used, e.g., when the CS line is not selecting the peripheral device.

The embodiments described above are given by way of example, and other suitable embodiments can also be used. For example, although in the embodiments described above a certain partition of tasks has been assumed among output sampler 52 input sampler 56 and processor 44. For example, the input and output samplers mainly perform signal sampling and clock selection, whereas processor 40 mainly detects transaction violation and applies security action in response. This task partition is not mandatory and other suitable partitions can also be used.

In the embodiments above, security device 32 (and 132) comprises a single DL. In alternative embodiments, the security device may comprise multiple DLs, each calibrated to a different required time delay. This may be useful, for example, when different transactions require different respective time delays for reliable sampling.

The embodiments described above refer mainly to monitoring signals of a SPI bus. In alternative embodiments, other suitable buses can also be used, such as, for example, the I²C bus that comprises only a data line and a clock line.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A security device, comprising:
    a bus interface coupled to a bus connecting between a host device and a peripheral device; and
    circuitry configured to:
        receive, via the bus interface, a clock signal of the bus, and produce a delayed clock signal relative to the clock signal;
        monitor, using the clock signal, transactions communicated between the host device and the peripheral device;
        in response to identifying a given transaction of which a portion is expected to be delayed by a predefined time delay relative to the clock signal, sample a request part of the given transaction, sent from the host device to the peripheral device, using the clock signal, and sample a response part of the given transaction, sent from the peripheral device to the host device, using the delayed clock signal; and in response to identifying, based on the sampled portion, that the given transaction violates a security policy, apply a security action.

2. The security device according to claim 1, wherein the circuitry comprises a Delay Line (DL), and wherein the circuitry is configured to produce the delayed clock signal by delaying the clock signal using the DL.

3. The security device according to claim 2, wherein the DL comprises a Delay Locked Loop (DLL) comprising a chain of multiple delay elements with selectable outputs.

4. The security device according to claim 2, wherein the DL supports multiple selectable settings corresponding to multiple respective time delay values, and wherein the circuitry is configured to select among the settings a chosen setting for which an actual time delay between the delayed clock signal and the clock signal best approximates the predefined time delay, and to set the DL to the chosen setting.

5. The security device according to claim 2, wherein to calibrate the DL, the circuitry is configured to operate the DL in a ring oscillator mode, to measure a frequency produced by the DL in the ring oscillator mode, and to calculate the actual time delay based on the measured frequency.

6. The security device according to claim 2, wherein the circuitry is configured to calibrate the DL during time periods in which no transactions that require sampling using the delayed clock are expected.

7. The security device according to claim 2, wherein the circuitry comprises another DL, and wherein the circuitry is configured to calibrate the another DL to produce a calibrated delayed clock signal based on the predefined time delay, and to select the calibrated delayed clock signal instead of the delayed clock signal.

8. The security device according to claim 1, wherein the bus comprises a Serial Peripheral Interface (SPI) bus, wherein the peripheral device comprises a SPI Flash memory that provides delayed data upon read, wherein the given transaction comprises a read operation from the SPI Flash memory, and wherein the circuitry is configured to sample the delayed data retrieved from the SPI Flash memory using the delayed clock signal.

9. The security device according to claim 1, wherein to identify that the given transaction violates the security policy, the circuitry is configured to (i) detect an attempt to access a protected address region in the peripheral device, or (ii) identify that data sent to the host device is invalid.

10. A method for data security, comprising:
in a security device comprising a bus interface coupled to a bus connecting between a host device and a peripheral device,
receiving, via the bus interface, a clock signal of the bus, and producing a delayed clock signal relative to the clock signal;
monitoring, using the clock signal, transactions communicated between the host device and the peripheral device;
in response to identifying a given transaction, of which a portion is expected to be delayed by a predefined time delay relative to the clock signal, sampling a request part of the given transaction, sent from the host device to the peripheral device, using the clock signal, and sampling a response part of the given transaction, sent from the peripheral device to the host device, using the delayed clock signal; and
in response to identifying, based on the sampled portion, that the given transaction violates a security policy, applying a security action.

11. The method according to claim 10, wherein producing the delayed clock signal comprises delaying the clock signal using a Delay Line (DL) of the security device.

12. The method according to claim 11, wherein the DL comprises a Delay Locked Loop (DLL) comprising a chain of multiple delay elements with selectable outputs.

13. The method according to claim 11, wherein the DL supports multiple selectable settings corresponding to multiple respective time delay values, and wherein producing the delayed clock signal comprises selecting among the settings a chosen setting, for which an actual time delay between the delayed clock signal and the clock signal best approximates the predefined time delay, and setting the DL to the chosen setting.

14. The method according to claim 11, wherein producing the delayed signal comprises calibrating the DL by operating the DL in a ring oscillator mode, measuring a frequency produced by the DL in the ring oscillator mode, and calculating the actual time delay based on the measured frequency.

15. The method according to claim 11, wherein producing the delayed clock comprises calibrating the DL during time periods in which no transactions that require sampling using the delayed clock are expected.

16. The method according to claim 11, wherein the security device comprises another DL, and wherein producing the delayed clock comprises calibrating the another DL to produce a calibrated delayed clock signal based on the predefined time delay, and selecting the calibrated delayed clock signal instead of the delayed clock signal.

17. The method according to claim 10, wherein the bus comprises a Serial Peripheral Interface (SPI) bus, wherein the peripheral device comprises a SPI Flash memory that provides delayed data upon read, wherein the given transaction comprises a read operation from the SPI Flash memory, and comprising sampling the delayed data retrieved from the SPI Flash memory using the delayed clock signal.

18. The method according to claim 10, wherein identifying that the given transaction violates the security policy comprises (i) detecting an attempt to access a protected address region in the peripheral device, or (ii) identifying that data sent to the host device is invalid.

* * * * *